US010409234B2

(12) United States Patent
Kitaji (10) Patent No.: US 10,409,234 B2
(45) Date of Patent: Sep. 10, 2019

(54) POWER CONTROL APPARATUS, POWER CONTROL SYSTEM, AND POWER CONTROL METHOD

(71) Applicant: KYOCERA CORPORATION, Kyoto (JP)

(72) Inventor: Mitsuhiro Kitaji, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 534 days.

(21) Appl. No.: 14/360,742

(22) PCT Filed: Nov. 27, 2012

(86) PCT No.: PCT/JP2012/080657
§ 371 (c)(1),
(2) Date: May 27, 2014

(87) PCT Pub. No.: WO2013/080984
PCT Pub. Date: Jun. 6, 2013

(65) Prior Publication Data
US 2014/0324193 A1    Oct. 30, 2014

(30) Foreign Application Priority Data
Nov. 28, 2011    (JP) .................................. 2011-259472

(51) Int. Cl.
*G05B 15/02*    (2006.01)
*H02J 3/14*    (2006.01)
(Continued)

(52) U.S. Cl.
CPC ................ *G05B 15/02* (2013.01); *H02J 3/14* (2013.01); *H02J 13/0075* (2013.01);
(Continued)

(58) Field of Classification Search
CPC ........ G05B 15/02; H02J 3/14; H02J 13/0075; H02J 2003/003; H02J 2003/143;
(Continued)

(56) References Cited

U.S. PATENT DOCUMENTS 6,759,944 B1 *    7/2004    Shima .................... G08B 5/226
340/7.55
2001/0049754 A1 *    12/2001    Kawase ............. G05B 19/4142
710/22
(Continued)

FOREIGN PATENT DOCUMENTS

AU        199949036 A1    1/2000
JP        S63-181617 A    7/1988
(Continued)

OTHER PUBLICATIONS

Extended European Search Report dated Jul. 16, 2015 issued by the European Patent Office for Counterpart European Application No. PCT/JP20121080657.
(Continued)

*Primary Examiner* — Robert E Fennema
*Assistant Examiner* — Michael W Choi
(74) *Attorney, Agent, or Firm* — Procopio Cory Hargreaves and Savitch LLP (57) ABSTRACT

The HEMS controls equipment provided in a consumer. The HEMS comprises a transceiver unit that transmits a command to instruct processing executed by the equipment and a control unit that acquires start time information indicating a time from when the equipment receives the command to when the equipment starts processing according to the command from the equipment and controls the equipment based on the acquired start time information.

15 Claims, 5 Drawing Sheets

(51) Int. Cl.
*H02J 13/00* (2006.01)
*H02J 3/00* (2006.01)

(52) U.S. Cl.
CPC ... *H02J 2003/003* (2013.01); *H02J 2003/143* (2013.01); *Y02B 70/3225* (2013.01); *Y02B 70/3266* (2013.01); *Y02B 90/2653* (2013.01); *Y04S 20/222* (2013.01); *Y04S 20/242* (2013.01); *Y04S 40/126* (2013.01)

(58) Field of Classification Search
CPC .......... Y02B 70/3225; Y02B 70/3266; Y02B 90/2653; Y04S 20/222; Y04S 20/242; Y04S 40/126
USPC ........................................... 700/22
See application file for complete search history.

(56) References Cited

U.S. PATENT DOCUMENTS

| | | | | |
|---|---|---|---|---|
| 2003/0204756 | A1* | 10/2003 | Ransom | G01D 4/004 713/300 |
| 2003/0217138 | A1* | 11/2003 | Shimba | H04L 29/06 709/223 |
| 2004/0103329 | A1 | 5/2004 | Morisawa | |
| 2004/0133314 | A1* | 7/2004 | Ehlers | F24F 11/0012 700/276 |
| 2005/0026013 | A1* | 2/2005 | Sakakida | H01M 8/04223 429/429 |
| 2007/0285713 | A1 | 12/2007 | Yamamoto et al. | |
| 2009/0047555 | A1* | 2/2009 | Sugawara | H01M 8/04089 429/410 |
| 2009/0302801 | A1* | 12/2009 | Katsunaga | B60L 11/1816 320/109 |
| 2010/0004793 | A1* | 1/2010 | Ohkuwa | H02J 1/14 700/295 |
| 2011/0071692 | A1* | 3/2011 | D'Amato | G05B 17/02 700/291 |
| 2011/0088067 | A1* | 4/2011 | Azuma | H04N 5/4403 725/58 |
| 2011/0138464 | A1* | 6/2011 | Ohta | G06F 21/74 726/22 |
| 2011/0184586 | A1* | 7/2011 | Asano | G05B 15/02 700/297 |
| 2012/0150359 | A1* | 6/2012 | Westergaard | H02J 3/14 700/291 |
| 2013/0060352 | A1* | 3/2013 | Kouda | G06Q 50/06 700/22 |
| 2016/0118795 | A1* | 4/2016 | Berkowitz | H02J 3/1807 700/286 |

FOREIGN PATENT DOCUMENTS

| | | | | |
|---|---|---|---|---|
| JP | H06-334701 | A | 12/1994 | |
| JP | 2002-520901 | A | 7/2002 | |
| JP | 2003-032899 | A | 1/2003 | |
| JP | 2004-180404 | A | 6/2004 | |
| JP | 2007-293729 | A | 11/2007 | |
| JP | 2007-331174 | A | 12/2007 | |
| JP | 2008-021152 | A | 1/2008 | |
| JP | 2008-131755 | A | 6/2008 | |
| JP | 2009-142042 | A | 6/2009 | |
| JP | 2010-067182 | A | 3/2010 | |
| JP | 2010-233398 | A | 10/2010 | |
| JP | WO/2011/142131 | * | 11/2011 | ............. H02J 13/00 |
| WO | 2006/006224 | A1 | 1/2006 | |

OTHER PUBLICATIONS

Office Action dated Oct. 11, 2016 issued in counterpart Japanese Application No. 2015-256421.

International Search Report; PCT/JP2012/080657; dated Feb. 12, 2013.

Office Action dated Mar. 6, 2018 issued in counterpart Japanese Application No. 2017-091654.

* cited by examiner

POWER CONTROL APPARATUS, POWER CONTROL SYSTEM, AND POWER CONTROL METHOD

TECHNICAL FIELD

The present invention relates to a power control apparatus that controls equipment provided in a consumer, a power control system, and a power control method.

BACKGROUND ART

In recent years, a power control apparatus, for the purpose of totally managing energy in a consumer and such as relieving a load of a power grid and energy saving, has begun to be introduced. The power control apparatus is called an EMS (Energy Management System). Also, various types of power control apparatuses are proposed as for various consumers and for example, among such power control apparatuses, which intended for a house is called a HEMS (Home Energy Management System).

For the power control apparatus performs an appropriate energy management, it is necessary to transmit a command to execute processing at optimum timing to equipment and control the equipment more minutely.

Accordingly, art that equipment notify a power control apparatus of time until the equipment become to be a receivable state again after a command (a command for instructions) is transmitted to the equipment by the power control apparatus is disclosed (for example, Patent Literature 1). Since the power control apparatus can grasp next receivable timing of the equipment, the transmission of unnecessary command can be suppressed, by applying the art.

CITATION LIST

Patent Literature

Patent Literature 1: Japanese Patent Application Publication No. H6-334701

SUMMARY OF INVENTION

However, while the power control apparatus can grasp next receivable timing of the equipment in the prior art, the equipment is not capable of grasping a detailed state such as when the equipment execute processing according to a command. Accordingly, it is difficult for the power control apparatus to allow the equipment to execute processing at appropriate timing.

Therefore, the present invention is to solve the problem described above and to provide a power control apparatus, a power control system, and a power control method enabling equipment to execute processing at appropriate timing by grasping a state of equipment in further detail.

A power control apparatus according to a first feature controls equipment provided in a consumer. The power control apparatus comprises a transceiver unit that transmits a command to instruct processing executed by the equipment and a control unit that acquires start time information indicating a time from when the equipment receives the command to when the equipment starts processing according to the command from the equipment and controls the equipment based on the acquired start time information.

In the other feature of the first feature, the control unit acquires completion time information indicating a time from when the equipment receives the command to when the equipment completes processing according to the command from the equipment and controls the equipment based on the acquired completion time information.

In the other feature of the first feature, the control unit acquires the start time information and the completion time information when the equipment is initially registered in the power control apparatus through a communication network.

In the other feature of the first feature, the transceiver unit receives the response message indicating the reception of the command from the equipment. The response message includes the start time information and the completion time information. The control unit acquires the start time information and the completion time information from the response message received by the transceiver unit.

In the other feature of the first feature, the response message includes the unprocessed command information indicating a presence/absence of the unprocessed command of which processing is not completed by the equipment. The control unit acquires the unprocessed command information.

In the other feature of the first feature, the response message further includes the unprocessed command identification information indicating a type of the unprocessed command of which processing is not completed by the equipment and the unprocessed command number information indicating a number of the unprocessed commands. The control unit acquires the unprocessed command identification information and the unprocessed command number information.

In the other feature of the first feature, the control unit comprises a schedule determination unit that determines a schedule to control the equipment based on the start time information and the completion time information.

In the other feature of the first feature, the control unit further comprises a confirmation timing determination unit that determines timing to confirm a state of the equipment based on the start time information and the completion time information.

The confirmation timing determination unit determines a period between from a start scheduled time to a completion scheduled time of processing according to the command as timing to transmit a state information command to confirm an execution state of processing according to the command. The start scheduled time is when a time indicated by the start time information passes after the response message is received by the transceiver unit. The completion scheduled time is when a time indicated by the completion time information passes after the response message is received by the transceiver unit.

A power control system according to a second feature comprises equipment provided in a consumer and a power control apparatus that controls the equipment. The power control apparatus comprises a transceiver unit that transmits a command to the equipment and a control unit that acquires start time information indicating a time from when the equipment receives the command to when the equipment starts processing according to the command from the equipment and controls the equipment based on the acquired start time information.

A power control method according to a third feature in a power control apparatus controls equipment provided in a consumer through a communication network. The power control method includes a step of transmitting a command to the equipment, a step of acquiring start time information indicating a time from when the equipment receives the command to when the equipment starts processing according to the command from the equipment and a step of controlling the equipment based on the acquired start time information.

According to the present invention, it is possible to provide a power control apparatus, a power control system, and a power control method to perform efficient control of equipment by grasping a state of equipment in further detail.

DESCRIPTION OF THE EMBODIMENT

Hereinafter, the embodiment of the present invention will be described with reference to the accompanying drawings. In the descriptions of the drawings below, the same or similar reference signs are assigned to the same or similar portions. However, it must be noted that the drawings are schematic, and the ratio of each dimension and the like are different from the real ones. Accordingly, specific dimensions and the like are should be determined by taking the following descriptions into consideration. Further, among the drawings, portions that the relationships or the ratios of the dimensions are different from each other are included.

[First Embodiment ]

Figure 1:
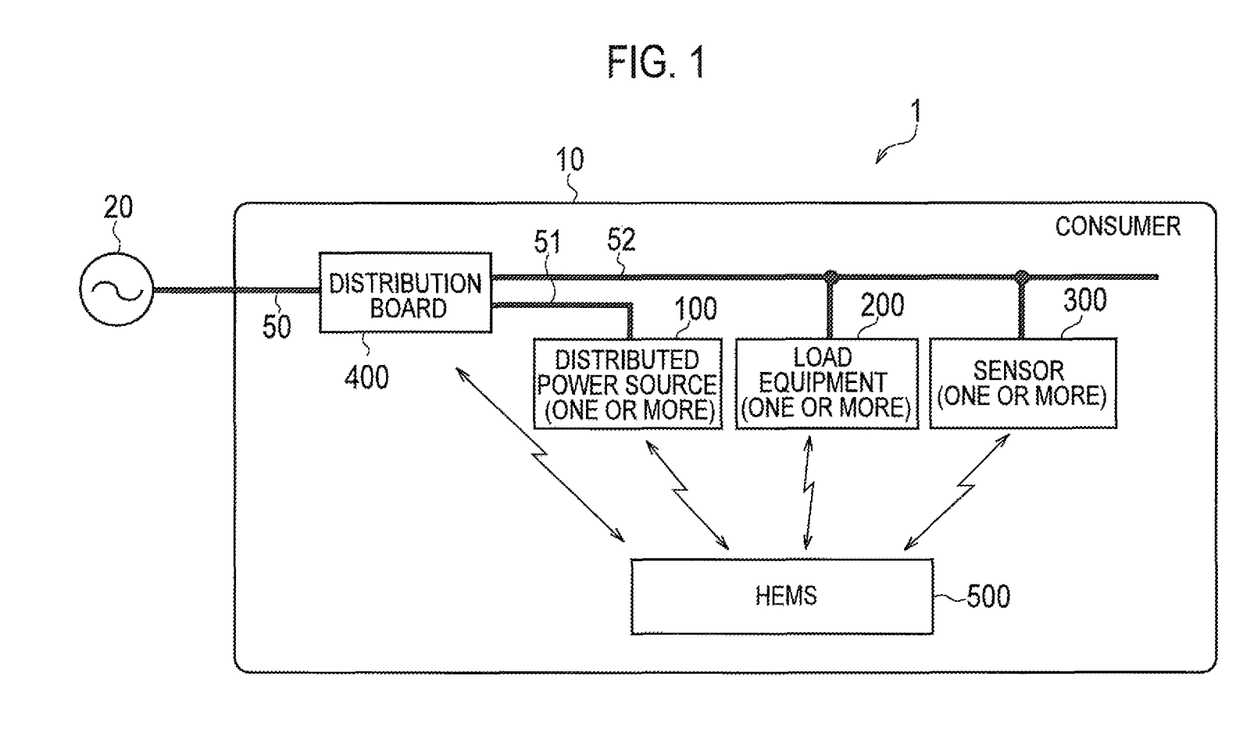
FIG. 1 is a diagram indicating a power control system according to the first embodiment.

A power control system according to a first embodiment will be described. FIG. 1 is a diagram indicating a power control system 1 according to the first embodiment.

As shown in FIG. 1, the power control system 1 is provided in a consumer 10. In the present embodiment, the consumer 10 is assumed to be a house and the like. The power control system 1 performs a power control in the consumer 10 that is connected to a power grid 20. The power control system 1 comprises a distributed power source 100, a load 200, a sensor 300, a distribution board 400, and a HEMS 500.

The distributed power source 100 supplies a power to equipment provided in the consumer 10. For example, as a distributed power source 100, a fuel cell such as a SOFC (Solid Oxide Fuel Cell), or a power generation apparatus using clean energy such as solar light, wind power and geothermal heat, or a storage battery for storing power or discharging can be considered. A battery for an electric vehicle may be included in a storage battery.

The load 200 is an apparatus that consumes a power supplied through a power line 52. For example, the load 200 includes an apparatus such as a refrigerator, a lighting, an air conditioner, and a television. The load may be a singular apparatus and also may be a plurality of apparatuses.

The sensor 300 measures an environmental state in the consumer 10. For example, the sensor 300 functions a temperature sensor to measure temperature, but is not limited to that. The sensor 300 may be, for example, a sensor disposed inside the distribution board 400 for measuring a power consumption consumed in the consumer 10, a sensor for measuring a power supplied from the distributed power source 100, or a sensor for measuring a power that is a reverse power flow from the distributed power source 100 to the grid 20. The sensor 300 comprised by a power control system 1 may also be a single sensor or a plurality of sensors.

The distribution board 400 is connected to the grid 20 through a power line 50, is connected to the distributed power source 100 through a power line 51, and is connected to the load 20 through a power line 52. The distribution board 400 distributes a power supplied from the grid 20 through the power line 50 and a power supplied from the distributed power source 100 through the power line 51 to the load 200 through the power line 52.

The HEMS 500 is an example of a power control apparatus, and is an apparatus for managing a power of consumer 10 (HEMS; Home Energy Management System). The HEMS 500 is connected to the distributed power source 100, the load 200, the sensor 300, and the distribution board 400 through a communication network. The communication network may be by radio or through wires. Below, the distributed power source 100, the load 200, the sensor 300, and the distribution board 400 are explained as "equipment" accordingly.

Figure 2:
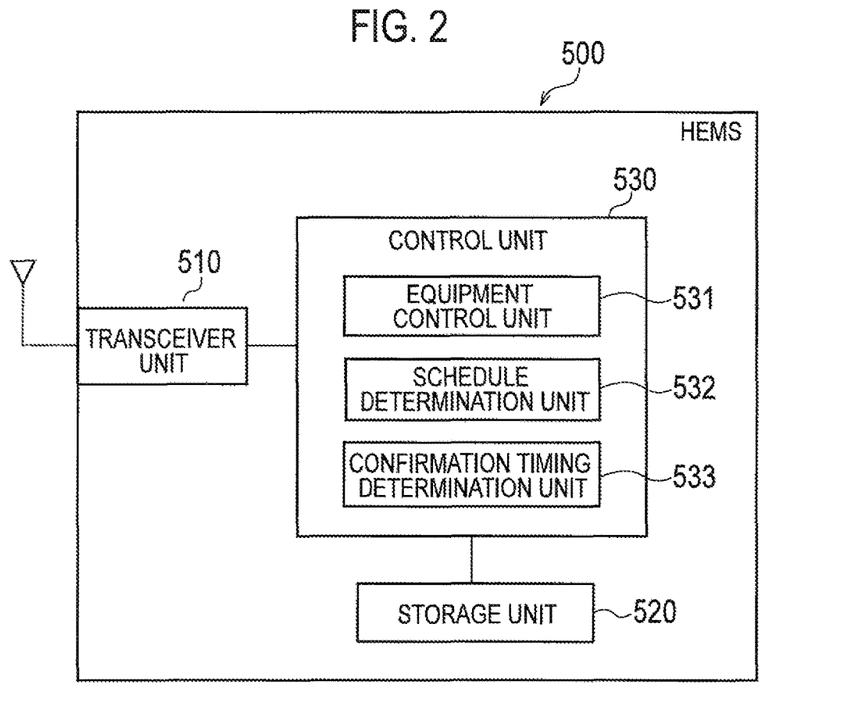
FIG. 2 is a block diagram indicating a HEMS according to the first embodiment.

The HEMS 500 in the present embodiment controls equipment provided in the consumer 10 through the communication network. The HEMS 500 controls the equipment with a signal format based on a prescribed communication protocol such as ECHONET Lite standards, ZigBee SEP2.0 standards, or KNX standards. Specifically, the HEMS 500 comprises, as shown in FIG. 2, the transceiver unit 510, the storage unit 520, and the control unit 530.

The transceiver unit 510 communicates the equipment such as the distributed power source 100, the load 200, the sensor 300, and the distribution board 400 through the communication network. The transceiver unit 510 transmits a processing command outputted from the control unit 530 by using the signal format based on the prescribed communication protocol such as ECHONET Lite standards described above to equipment. The processing command is a command for the HEMS 500 to instruct processing executed by the equipment. When a new equipment is connected to the communication network, the transceiver unit 510 receives a registration request message to request a registration in the HEMS 500 from the new equipment and outputs the registration request message to the control unit 530. Further, the transceiver unit 510 acquires a registration response message indicating completion of registration of the new equipment in the HEMS 500 and a capability information request message for requiring the capability information on the new equipment of the new equipment from the control unit 530. The transceiver unit 510 transmits the registration response message and the capability information request message acquired from the control unit 530 by using the signal format based on the prescribed protocol to the new equipment.

Here, the capability information is information indicating executable processing (capability) by the equipment. For example, in case that the equipment (the load 200) is a heating apparatus, the capability information includes information indicating a temperature range enabling operation.

Further, the capability information in the present embodiment includes equipment identification information indicating the equipment providing the capability information, process identification information P for identifying executable processing by the equipment, start time information TS, and completion time information TE. If the new equipment is capable of execute a plurality of processing, the capability information includes the process identification information P, the start time information TS, the completion time information TE according to the number of executable processing. In the present embodiment, the equipment identification information is included in the capability information, but the equipment identification information may be included in the registration request message as described above.

Here, the start time information TS is information indicating a time (s) from when the equipment receives the processing command to when the equipment starts processing according to the processing command. The completion time information TE is information indicating a time (s) from when the equipment receives the processing command to when the equipment completes processing according to the processing command. The transceiver unit 510 outputs the capability information to the control unit 530 when the transceiver unit 510 receives the capability information from the equipment. The control unit 530 acquires the capability information from the transceiver unit 510.

Figure 3:
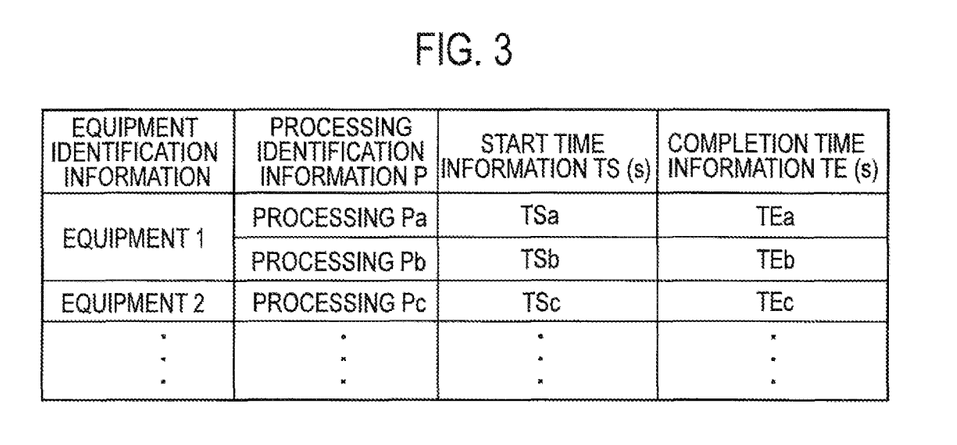
FIG. 3 is a diagram showing information stored in a storage unit according to the first embodiment.

The storage unit 520 stores a program that the control unit 530 performs and is used as a work area during the performance of the program at the control unit 530. The storage unit 520 stores various information such as capability information acquired by the control unit 530 through the transceiver unit 510. Specifically, the storage unit 520 stores, as shown in FIG. 3, "equipment 1" that is equipment identification information, "processing Pa" that is process identification information P, "TSa" that is the start time information TS, and "Tea" that is the completion time information TE in association with each other. The storage unit 520 stores "equipment 1" that is equipment identification information, "processing Pb" that is process identification information P, "Tsb" that is the start time information TS, and "TEb" that is the completion time information TE in association with each other. The storage unit 520 stores "equipment2" that is equipment identification information, "processing Pc" that is process identification information P, "TSc" that is the start time information TS, and "Tec" that is the completion time information TE in association with each other.

The control unit 530 controls various functions of the power control system 1 and is configured by using a CPU and a memory. The control unit 530 comprises an equipment control unit 531, a schedule determination unit 532, and the confirmation timing determination unit 533.

The equipment control unit 531 controls the equipment provided in the consumer 10 by using the processing command. The equipment control unit 531 controls the equipment based on a schedule by determined by the schedule determination unit 532 described later. Specifically, the equipment control unit 531 instructs such as On/Off of a power supply, a power generation, charging and discharging to the equipment to be controlled using the processing command. Since the processing command is different by functions comprised by the equipment, it is possible to define the other various processing command without being limited by this.

Also, the equipment control unit 531 confirms an operating state of the equipment based on timing to be confirmed a state of the equipment determined by the confirmation timing determination unit 533. Specifically, the equipment control unit 531 transmits a state information command for making the equipment notify the operation state of the equipment by using the signal format based on the prescribed protocol to the equipment through the transceiver unit 510. The equipment control unit 531 grasps the state of the equipment by acquiring the state response message transmitted by the equipment through the transceiver unit 510.

The equipment control unit 531 acquires the start time information and the completion time information of the equipment receiving the processing command from the equipment.

In the present embodiment, the equipment control unit 531 acquires the start time information and the completion time information when the new equipment is initially registered in the HEMS 500 through the communication network.

Specifically, when the transceiver unit 510 receives the capability information from the equipment, the equipment control unit 531 acquires the start time information, the completion time information, the equipment identification information, and the process identification information included in the capability information from the transceiver unit 510. The equipment control unit 531 may output an instruction message to instruct to transmit the start time information, the completion time information, and the process identification information of the equipment to the HEMS 500 to the equipment if necessary. In this case, the instruction message is transmitted to the equipment through the transceiver unit 510. Then, the storage unit 520 stores the equipment identification information, the start time information, the completion time information, and the process identification information acquired by the equipment control unit 531 in association with each other.

The schedule determination unit 532 determines the schedule to control the equipment based on the start time information and the completion time information. For example, when the equipment is the storage battery, the schedule determination unit 532 determines the schedule to execute processing of storage to prepare for timing to start processing of discharge (for example, timing of power consumption increases) based on the start time information and the completion time information.

Specifically, the schedule determination unit 532 specifies timing of power consumption increases by referring to a history of power consumption stored by the storage unit 520. The schedule determination unit 532 determines timing when the storage battery starts processing of discharge based on the timing of power consumption increase. The schedule determination unit 532 specifies the start time information TS and the completion time information TE of processing of storage stored in association with the storage battery by referring to the storage unit 520. The schedule determination unit 532 determines the schedule so as to transmit the processing command to the storage battery before time indicated by completion time information TE after timing when the storage battery starts processing of discharge. The schedule determination unit 532 notifies the equipment control unit 531 of the determined schedule.

The confirmation timing determination unit 533 determines timing to confirm a state of the equipment based on the start time information and the completion time information. Specifically, the confirmation timing determination unit 533 specifies the start time information TS and the completion time information TE by referring to the storage unit 520. For example, the confirmation timing determination unit 533 estimates that processing Pa is started in the equipment when time TSa indicated by the start time information TS passes after a processing response message A indicating a reception of the processing command by the equipment is received from the equipment. The confirmation timing determination unit 533 determines a period from when time TSa indicated by the start information passes after the processing response message A is received until time TEa indicated by the completion time information TE passes as timing to transmit a state information command to confirm an execution state of processing Pa in the equipment. The confirmation timing determination unit 533 notifies the equipment control unit 531 of determined timing to transmit the state information command.

The confirmation timing determination unit 533 may determine to transmit the state information command at prescribed period as the basis of the determined timing or determine to transmit the state information command at necessary timing.

(Energy Control Method)

Figure 4:
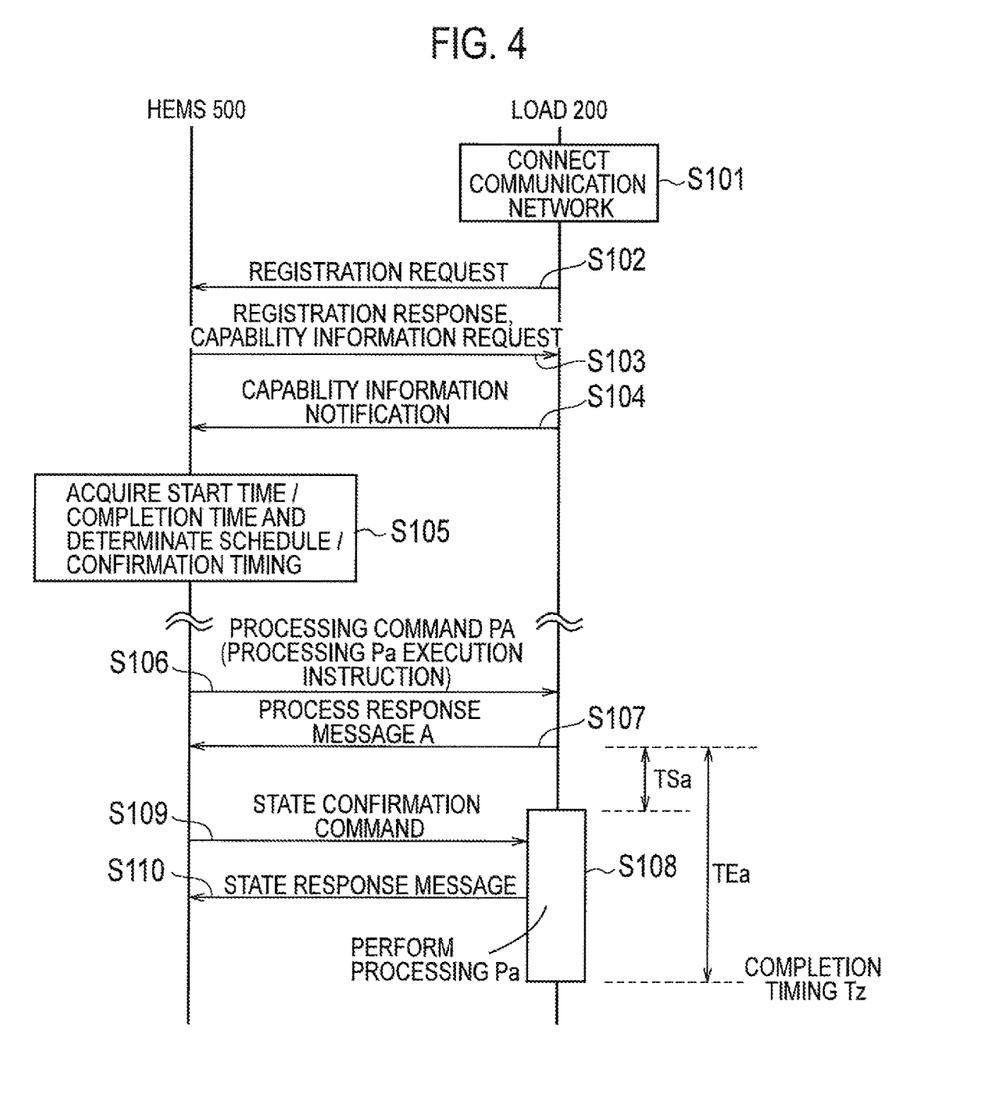
FIG. 4 is a sequence diagram showing a power control method according to the first embodiment.

Hereinafter, a power control method according to the first embodiment will be described. FIG. 4 is a sequence diagram showing the power control method according to the first embodiment. Specifically, FIG. 4 shows the power control method according to the present embodiment when the new loads 200 is connected to the communication network and is initially registered in the HEMS 500.

The following description is an example when Equipment is the load 200, the equipment is not limited to the load 200 and may be the distributed power source 100, the sensor 300, or the distribution board 400.

In the present embodiment, The HEMS 500 takes all of the load 200 provided in the consumer and the distributed power source 100, the sensor 300, and the distribution board 400 as a target of a power control shown below, but may take some equipment as the target.

In step S101, the load 200 is newly connected to the communication network. In step S102, the load 200 transmits the registration request message to require initial registration in the HEMS 500.

The registration request message is generated with the signal format based on the prescribed communication protocol such as ECHONET Lite, and includes information such as a model, a name of manufacture, and a production number of the load 200.

In step S103, the HEMS 500 transmits the registration response message indicating completion of registration of the load 200, and the capability information request message for requiring the capability information of the load 200 to the load 200.

In step S104, the load 200 transmits the capability information including the equipment identification information, the process identification information P, the start time information TS, and the completion time information TE to the HEMS 500.

In step S105, when the HEMS receives the capability information, the HEMS 500 acquires the equipment identification information for identifying the load 200, the process identification information P for identifying executable processing by the load 200, the start time information TS, and the completion time information TE. The HEMS 500 stores the equipment identification information, the process identification information P, the start time information TS, and the completion time information TE in association with each other in the storage unit 520.

Also, the HEMS 500 determines the schedule for making the load complete processing and timing to confirm a state of the load 200 by the completion timing Tz to complete prescribed processing Pa based on the start time information TS and the completion time information TE.

For example, the HEMS 500 determines the schedule to transmit a process command (hereinafter explained as "a process command PA") for making the load 200 execute processing Pa by subtracting time TEa indicated by the completion time information TE from the completion timing Tz as a schedule for making the load 200 complete processing Pa by the timing Tz.

Also, the HEMS 500 determines a period from when the completion time information TEa is subtracted from the completion timing Tz after time indicated by the start time information TSa passes as timing to transmit a state information command for timing to confirm the state of the load 200.

In step S106, the HEMS 500 transmits the process command PA for making the load 200 execute the processing Pa to the load 200 based on the schedule determined at the step S105, In step S107, the load 200 transmits a processing response message (hereinafter explained as "processing response message A") indicating a reception of the process command PA to the HEMS 500.

In step S108, the load 200 executes the processing Pa according to the process command PA. Specifically, the load 200 starts the processing Pa when time TSa indicated by the start time information TS passes after the processing response message A is transmitted and completes the processing Pa when time TEa indicated by the completion time information TE passes.

In step S109, the HEMS 500 transmits, a state information command to the load 200 after time TSa indicated by the start time information TS passes from the reception of the processing response message A. That is, the HEMS 500 does not transmit the state information command from when the processing response message A is received until time TSa indicated by the start time information TS. This is because of the following reasons. The HEMS 500 does not need to confirm the state of the load 200 using the state information command since execution of the processing Pa is not started until time TSa indicated by the start time information TS after the reception of the processing response message A and the state of the load 200 is not changed.

In step S110, the load 200 transmits the state response message in response to the state information command to the HEMS 500. The state response message may including information indicating a presence/absence of execution of the processing Pa and may information indicating the execution state of the processing Pa (for example, current heating temperature 20 degrees) at a point of time of the reception of the state information command.

In the HEMS 500 according to the present embodiment, the equipment control unit 531 acquires the start time information until the load 200 (equipment) starts processing according to the processing command after the load 200 (equipment) receives the processing command and the completion time information until the load 200 (equipment) completes processing according to the processing command after the load 200 (equipment)) receives the processing command. Since the HEMS 500 according to the present embodiment is capable of prevent a useless transmission of the state information command before processing is started by the equipment, it is capable of suppressing interference in the communication network and reducing a processing load of the HEMS.

Also, in the prior art, since the HEMS is not capable of recognizing as only processing executed by the equipment by transmitting the processing command, for example, it is possible that a state of the equipment recognized by the HEMS and a state of the equipment indicated by the state response message do not coincide and a misoperation may be caused. Since the HEMS 500 according to the present embodiment transmits the state information command to the equipment between from start of processing to completion of processing, it is capable of prevent non-coincidence with a state of the equipment recognized by the HEMS and a state of the equipment indicated by the state response message and a misoperation can be suppressed.

Further, in case that the equipment is the SOFC, it actually takes a long time to start generating power when a processing command for making the SOFC start generating power, and the HEMS according to the prior art is not actually capable of grasping timing of generating power started by the SOFC. Accordingly, in the HEMS according to the prior art, it is difficult to make the SOFC start generating power with desired timing and there are problems on the waste of fuel when the timing is too early and to be not capable of performing an appropriate energy management when the timing is too late. Since the HEMS 500 according to the present embodiment grasps actual timing of generating power started by the SOFC, such problems can be avoided.

Further, in case of saving energy, the prior art does not grasp time until the power consumption actually begins to decrease after the processing command for instructing a power off of the equipment by the equipment, that is, completion time of processing according to the processing command, and therefore an appropriate energy management cannot be done. The HEMS 500 according to the present embodiment is capable of grasping completion time of processing according to the processing command by acquiring the completion time information and therefore the equipment can be controlled effectively.

[First Modification]

Hereinafter, a first modification of the first embodiment will be described. Below, main differences from the first embodiment will be described.

In the HEMS 500 according to the first embodiment described above, the equipment control unit 531 is configured to acquire the start time information and the completion time information included in the capability information transmitted from the load 200.

In the present modification, the processing response message includes the start time information and the completion time information. The equipment control unit 531 according to the present modification acquires the start time information and the completion time information included in the processing response message when the processing response message is received by the transceiver unit 510.

Figure 5:
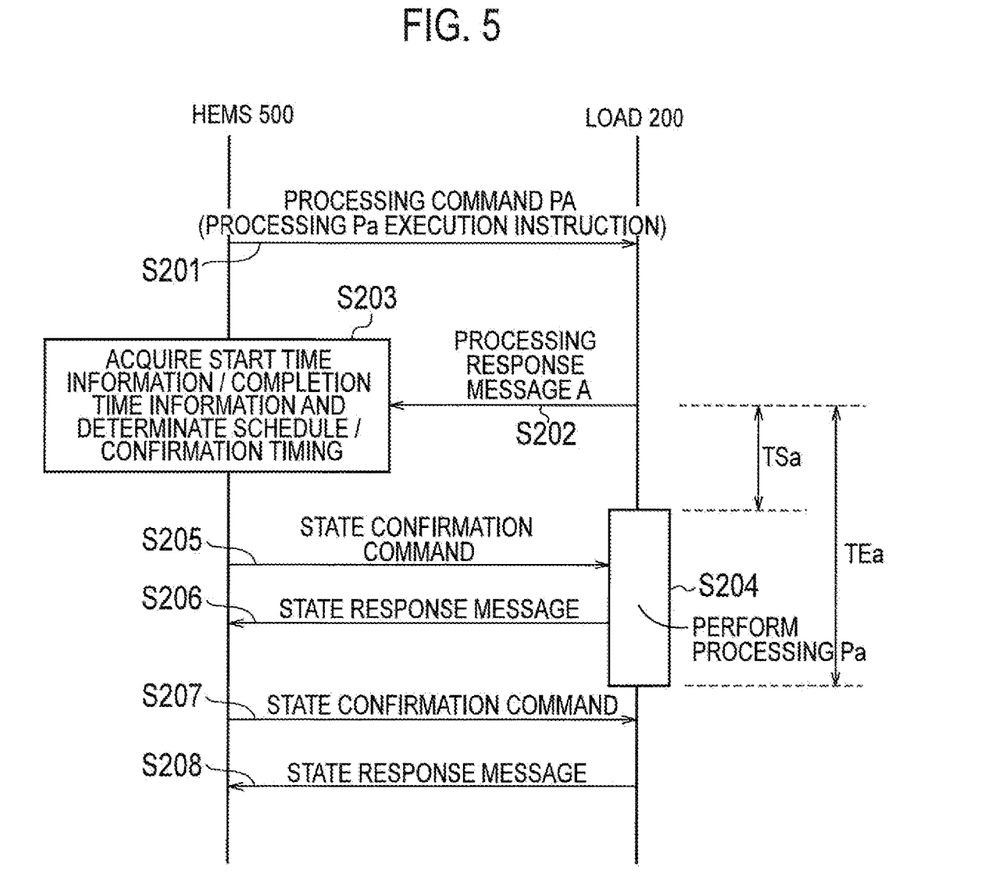
FIG. 5 is a sequence diagram showing a power control method according to a first modification.

It will be described in detail with reference to FIG. 5. In FIG. 5, the sequence diagram of a power control method according to the present modification is shown. As shown in FIG. 5, instep S201, the HEMS 500 transmits the process command PA to execute the prescribed processing Pa to the load 200.

In step S202, the load 200 transmits a processing response message A indicating a reception of the process command PA to the HEMS 500.

In step S203, The HEMS 500 acquires the start time information TS and the completion time information TE included in the processing response message A. The HEMS 500 estimates timing to start processing A according to the process command PA based on time indicated by the start time information TS and determines transmission timing of the state information command. Specifically, The HEMS 500 estimates that the processing Pa is started when time TSa indicated by the start time information TS passes after the processing response message A is received and determines to transmit the state information command for confirming a execute state of processing A until time TEa indicated by the completion time information TE passes after time TSa indicated by the start time information TS passes. The HEMS 500 may determine the schedule to transmit the processing command for instructing other processing to the load 200 so as to make the load 200 execute the other processing after time TEa to be completed to execute the processing Pa by the load 200 passes.

In step S204, the load 200 executes the processing Pa according to the process command PA. Specifically, the load 200 starts the processing Pa when time TSa passes after transmitting the processing response message A and completes the processing Pa when time TEa passes after transmitting the processing response message A.

In step S205, the HEMS 500 transmits the state information command to the load 200 after time TSa passes since the processing response message A.

In step S206, the load 200 transmits the state response message in response to a state information command to the HEMS 500.

In step S207, the HEMS 500 transmits , the state information command to the load 200 after time TEa passes since the processing response message A is received. That is, the HEMS 500 confirms that the processing Pa is completed as scheduled by the load 200 by transmitting the state information command to the load 200 after the processing Pa is completed by the load 200.

In step S208, the load 200 transmits the state response message in response to the state information command to the HEMS 500.

Thus, in the HEMS 500 according to the present modification, as with the first embodiment described above, the load 200(equipment) is capable of grasping a state from start of the processing to completion of the processing and therefore the equipment in the consumer 10 can be controlled effectively.

[Second Modification]

Below, a second modification of the first embodiment will be described. Below, main differences from the first embodiment will be described.

In the embodiment described above, in the HEMS 500, the schedule determination unit 532 is configured to determine the schedule to control the load 200 based on the start time information and the completion time information, but functions of the schedule determination unit 532 is not limited to this.

Figure 6:
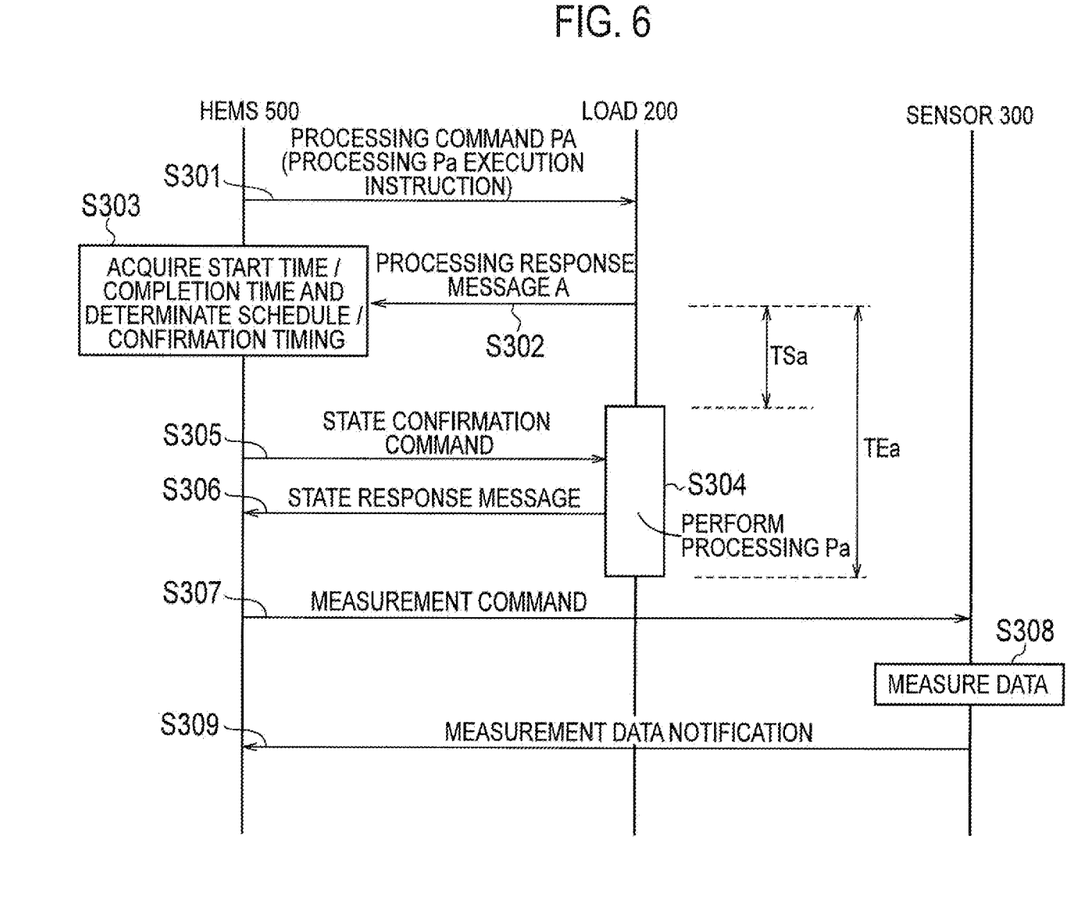
FIG. 6 is a sequence diagram showing a power control method according to a second modification.

The schedule determination unit 532 according to the present modification determines the schedule to control other equipment. Specifically, It will be described with reference to FIG. 6. In FIG. 6, a sequence diagram of a power control method according to the present modification is shown.

Here, an example will be described in case that one of equipment is the load 200 (for example, the heating apparatus) and other equipment is the sensor 300 (for example, the temperature sensor). Since operations of step S301 to S302 are as well as operations of step S201 to S202 in the power control method according to the first modification describe above, the description will be omitted.

In step S303, the HEMS 500 acquires the start time information and the completion time information included in the processing response message A. The HEMS 500 estimates timing of the processing Pa started according to the process command PA by the load 200(the heating apparatus) and determines transmission timing of the state information command. Specifically, the HEMS 500 estimates that the processing Pa is started when time TSa indicated by the start time information TS passes since the processing response message A is received. Also, the HEMS 500 determines a period from when time TSa passes since the processing response message A is received until time TEa indicated by the completion time information TE passes as timing to transmit the state information command for confirming an execution state of the processing Pa.

Further, the HEMS 500 determines the schedule so as to make the sensor, which is other equipment, execute the prescribed processing after time TEa to be completed to execute the processing Pa by the load 200 passes.

Specifically, the HEMS 500 determines the schedule so as to make the sensor 300 execute measurement processing of inside temperature after time TEa to be completed to execute the processing Pa by the load 200 passes.

Since operations of step S304 to S306 are as well as operations of step S204 to S206 in the power control method according to the first modification describe above, the description will be omitted.

In step S307, the HEMS 500 transmits a processing command (a measurement command) for instructing to measure inside temperature and to notify the HEMS 500 of a measured inside temperature (a measurement data) to the sensor 300 after time TEa to be completed to execute the processing Pa by the load 200 passes.

In step S308, when the sensor 300 receives the processing command, the sensor 300 measures inside temperature. In step S309, the sensor 300 notifies the HEMS 500 of the measurement data.

As described above, in the HEMS 500 according to the present modification, the schedule determination unit 533 determines the schedule to control other equipment based on the start time information and the completion time information of specific equipment. Accordingly, the HEMS 500 associates a plurality of equipment provided in the consumer 10 and controls effectively.

In case of saving energy by controlling a plurality equipment, the HEMS 500 according to the present modification optimizes timing for controlling the plurality of equipment. For example, when power consumption of function α of specific equipment is large, it makes the storage battery discharge at timing to operate function a of the specific and therefore it is possible to supply power from the storage battery to the specific equipment A. Specifically, the HEMS 500 previously grasps time TS from outputting the processing command to discharge the storage battery until stable discharge is started and time TE from when the processing command is transmitted to the equipment A until processing is actually completed and then it is possible to makes the storage battery discharge at timing to operate function a of the specific equipment A.

[Third Modification]

Below, a third modification of the first embodiment will be described. Below, main differences from the first embodiment will be described.

The processing response message according to the present modification includes unprocessed command information indicating a presence/absence of a command not to be completed to execute processing (hereinafter referred to as "the unprocessed command") . The equipment control unit 531 acquires the unprocessed command information included in the response message.

According to the HEMS 500 in the present modification, since the processing response message includes the unprocessed command information, the HEMS 500 grasps, for example, that the load 200 holds the unprocessed command . Accordingly, the HEMS 500 is capable of determining the schedule of processing executed by the load 200 in consideration of the unprocessed command held by the load 200. Also, the HEMS 500 is capable of determining transmission timing of the state information command in consideration of the unprocessed command held by the load 200.

Also, the processing response message preferably further includes an unprocessed command identification information to identify a kind of the unprocessed command and an unprocessed command number information indicating the number of the unprocessed command. In this case, the equipment control unit 531 acquires the unprocessed command identification information and the unprocessed command number information included in the processing response message.

According to such the HEMS 500, it is possible to identify processing according to the unprocessed command based on the unprocessed command identification information and estimate a total time of timing to complete processing according to the unprocessed command base on the unprocessed command number information.

As described above, since the HEMS 500 according to the present modification grasps the state of the unprocessed command, by grasping the state of the load 200 (the equipment) in detail, the control of the equipment in the consumer 10 can be performed effectively.

[Other Embodiments]

The present invention has been described as the embodiments described above. However, it must not be understood that the discussions and the drawings that constitute a part of these disclosures limit the present invention. Various modifications, embodiments, and operation techniques will be apparent to those of ordinary skill in the art in viewing of these disclosures.

In the embodiment, a house is exemplified as a consumer and the HEMS 200 is exemplified as a power control apparatus. However, the power control apparatus may be, for example, a BEMS (Building and Energy Management System) that is intended for a building, a FEMS (Factory Energy Management System) intended for a factory, and also may be a CEMS (Community Energy Management System) intended for a community.

Also, in the embodiment, the HEMS 500 acquires the equipment identification information, the process identification information, the start time information, and the completion time information from the capability information received at initial registration or the processing response message, but the HEMS 500 may acquire the equipment identification information, the process identification information, the start time information and the completion time information from a server provided outside through a network such as an internet.

Also, a fuel cell used as the distributed power source 100 is not limited to the SOFC, for example, may be the PEFC.

Thereby, the present invention includes various embodiments which are not described here. Furthermore, it is possible to combine the embodiments and the modifications described above. Accordingly, the technique scope of the present invention should be merely determined with reference to the matters used to specify the present invention according to the appropriate claims from the above description.

Note that the entire content of the Japanese patent Application No. 2011-259472 (filed on Nov. 28, 2011) is incorporated herein by reference.

INDUSTRIAL APPLICABILITY

According to the present invention, it is possible to provide a power control, a power control system, and a power control method to efficiently control equipment provided in a consumer.

The invention claimed is:

1. A power control apparatus that controls a distributed power source provided in a consumer, the power control apparatus comprising:
   a transceiver; and
   a controller that
      acquires start time information for the distributed power source, wherein the start time information indicates a start time duration necessary for the distributed power source to start generating a power output, from a state in which the distributed power source is not generating the power output, after reception of a command to start the power output, and wherein acquiring the start time information comprises
         receiving a message from the distributed power source, via the transceiver, wherein the message includes the start time information, and
         extracting the start time information from the message, and
      controls the distributed power source, based on the acquired start time information for the distributed power source, by at least
         scheduling a time at which the distributed power source should start the power output, and
         controlling the transceiver to transmit the command to the distributed power source at a timing, such that the command will be received by the distributed power source at a time that is prior to the scheduled time by at least the start time duration.

2. The power control apparatus according to claim 1, wherein the controller further acquires completion time information for the distributed power source, wherein the completion time information indicates a completion time duration for the distributed power source to stop the power output, and wherein controlling the distributed power source is further based on the acquired completion time information.

3. The power control apparatus according to claim 2, wherein the controller acquires the start time information and the completion time information when the distributed power source is initially registered in the power control apparatus through a communication network.

4. The power control apparatus according to claim 2, wherein the controller controls the transceiver to transmit the command to start the power output to the distributed power source, and wherein acquiring the start time information and the completion time information comprises:
   receiving, as the message, a response message, indicating that the distributed power source received the command to start the power output, from the distributed power source, via the transceiver, wherein the response message includes the start time information and the completion time information; and
   extracting the start time information and the completion time information from the response message.

5. The power control apparatus according to claim 4, wherein the response message includes unprocessed command information indicating a presence or absence of unprocessed commands at the distributed power source.

6. The power control apparatus according to claim 5, wherein the unprocessed command information indicates a type of each unprocessed command and a number of unprocessed commands.

7. The power control apparatus according to claim 4, wherein the controller determines a schedule by which to control the distributed power source based on the start time information and the completion time information.

8. The power control apparatus according to claim 4, wherein the controller determines a time at which to confirm a state of the distributed power source based on the start time information and the completion time information.

9. The power control apparatus according to claim 8, wherein the controller determines the time at which to confirm the state of the distributed power source as a time between an expiration of the start time duration following reception of the response message and an expiration of the completion time duration following reception of the response message.

10. A power control system comprising:
   a distributed power source provided in a consumer; and
   a power control apparatus that controls the distributed power source, wherein the power control apparatus comprises
      a transceiver, and
      a controller that
         acquires start time information for the distributed power source, wherein the start time information indicates a start time duration necessary for the distributed power source to start generating a power output, from a state in which the distributed power source is not generating the power output, after reception of a command to start the power output, and wherein acquiring the start time information comprises
            receiving a message from the distributed power source, via the transceiver, wherein the message includes the start time information, and
            extracting the start time information from the message, and
         controls the distributed power source, based on the acquired start time information for the distributed power source, by at least
            scheduling a time at which the distributed power source should start the power output, and
            controlling the transceiver to transmit the command to the distributed power source at a timing, such that the command will be received by the distributed power source at a time that is prior to the scheduled time by at least the start time duration.

11. A power control method in a power control apparatus that controls a distributed power source provided in a consumer through a communication network, the power control method comprising:
   acquiring start time information for the distributed power source, wherein the start time information indicates a start time duration necessary for the distributed power source to start generating a power output, from a state in which the distributed power source is not generating the power output, after reception of a command to start the power output, and wherein acquiring the start time information comprises
      receiving a message from the distributed power source, via the transceiver, wherein the message includes the start time information, and
      extracting the start time information from the message; and
   controlling the distributed power source, based on the acquired start time information for the distributed power source, by at least
      scheduling a time at which the distributed power source should start the power output, and controlling the transceiver to transmit the command to the distributed power source at a timing, such that the command will be received by the distributed power source at a time that is prior to the scheduled time by at least the start time duration.

12. The power control apparatus according to claim 2, wherein the controller acquires the start time information and the completion time information from the distributed power source via the transceiver.

13. The power control apparatus according to claim 3, wherein acquiring the start time information and the completion time information when the distributed power source is initially registered in the power control apparatus comprises:
   receiving a registration request, comprising the start time information and the completion time information, from the distributed power source, via the transceiver; and
   extracting the start time information and the completion time information from the registration request.

14. The power control apparatus according to claim 4, wherein controlling the distributed power source, based on the acquired completion time information, comprises:
   determining a time after expiration of the completion time duration following reception of the response message; and
   waiting until the determined time to control the transceiver to transmit a command to perform a measurement to an equipment that is different than the distributed power source, wherein the equipment comprises a sensor for performing the measurement.

15. The power control apparatus according to claim 14, wherein the measurement comprises a measurement of an environmental state.

* * * * *